United States Patent [19]

Sharon

[11] 4,320,736
[45] Mar. 23, 1982

[54] PORTABLE OVEN

[76] Inventor: Arthur A. Sharon, 11 Stella Maris St., Barrio Kapitolyo, Pasig, Rizal, Philippines

[21] Appl. No.: 66,327

[22] Filed: Aug. 14, 1979

Related U.S. Application Data

[63] Continuation of Ser. No. 48,808, Jun. 15, 1979, abandoned, which is a continuation-in-part of Ser. No. 929,965, Aug. 1, 1978, abandoned, which is a continuation of Ser. No. 808,042, Jun. 20, 1977, abandoned.

[30] Foreign Application Priority Data

Jul. 12, 1976 [PH] Philippines .................................. 18692

[51] Int. Cl.³ .......................... A21B 1/00; A21B 1/52
[52] U.S. Cl. .......................... 126/19 M; 126/275 R; 219/386; 219/432; 219/438
[58] Field of Search ................ 126/19 M, 275 R, 273, 126/276; 219/386, 432, 438

[56] References Cited

U.S. PATENT DOCUMENTS

| | | | |
|---|---|---|---|
| 401,261 | 4/1889 | Fricker | 126/275 R |
| 747,475 | 12/1903 | Perky | 126/19 M |
| 2,001,285 | 5/1935 | Rehm | 126/275 |
| 3,270,740 | 9/1966 | Koos, Jr. | 126/275 R |

*Primary Examiner*—Samuel Scott
*Assistant Examiner*—Wesley S. Ratliff, Jr.

*Attorney, Agent, or Firm*—Stevens, Davis, Miller & Mosher

[57] ABSTRACT

There is disclosed a multi-piece potable oven having a base plate, an oven body, a cover, and any of a skillet, "mess tray", steamer, or funnel lid. The base plate has a circular bottom portion and an upwardly extending frusto-conical opening at the center. The oven body has an upwardly extending cylindrical sidewall and a substantially flat bottom with an upwardly extending frusto-conical opening at the center thereof which is adapted to fit on the upwardly extending frusto-conical opening of the base plate. The skillet is placed over the oven body for frying or broiling. The "mess tray" is placed over the oven body when additional space is desired for baking, roasting, and general heating. The steamer is placed over the oven body when vegetables or seafood are to be steamed. The funnel lid covers the upwardly extending frusto-conical opening at the center of the oven body when the portable oven is used for steaming or popping corn. The cover has a circular configuration, a flat glass top, and a downwardly extending skirt portion that is adapted to fit on the upper annular flange of the oven. The oven is adapted to be placed on top of a gas stove or gas range or an electric stove. The direct heat of the hot base plate combined with the heated air of the range will cause the food inside the oven to be cooked or baked.

5 Claims, 5 Drawing Figures

PORTABLE OVEN

This application is a continuation of Ser. No. 048,808 filed June 15, 1979, now abandoned, which is a continuation-in-part of copending application Ser. No. 929,965 filed Aug. 1, 1978, now abandoned which in turn is a continuation of application Ser. No. 808,042 filed June 20, 1977, now abandoned.

BACKGROUND OF THE INVENTION

1. Field of the Invention

This invention relates to an oven and more particularly to a portable oven that cooks food by indirectly heating the bottom of the oven while hot air is conveyed to the interior of the main food storage chamber of the oven in order to heat the food further. Afterwards, the hot air is effectively conveyed to the atmosphere by means of a plurality of holes bored on the skirt portion of the oven's cover.

2. Description of the Invention

Existing ovens commonly sold in local markets are made of heat-insulated boxes with a heating element inside. Those ovens used in baking breads are so bulky and very costly that they are not within the reach of ordinary housewives. Therefore, they use heated plates inside an isolated box and the direct flue gases from the gas burner of the oven in order to heat the interior of the baking chamber so that the dough inside will be baked and ready for consumption.

The disadvantage of the prior art oven is that they are too bulky and can only be used for commercial purposes. Furthermore, the cost and practical utility to a housewife is not conducive to buying such a unit.

In order to solve the problem of baking inside the oven without the use of bulky and highly insulated baking compartment, I therefore provide for an improved oven that does not utilize any heat insulator but is very efficient in baking bread that is enough for the consumption of a small family, e.g., six persons. The portable oven has a base plate, an oven body, and a cover which are adapted to be placed on top of a gas range or electric range. The portable oven of the present invention also has a skillet, "mess tray", steamer, or funnel lid that permit the oven to be used in a variety of ways that will be explained in more detail infra.

A baking vessel is described in U.S. Pat. No. 2,001,615 for stove-top cooking formed of an annular base, a ring-shaped main pan, and a lid. A secondary pan may be used if desired, the secondary pan being placed in the upper portion of the main pan.

SUMMARY OF THE INVENTION

The objects of the present invention include:

(1) To provide a portable oven that does not use a heat insulator that covers the entire baking chamber;

(2) To provide a base plate with an upwardly extending frusto-conical opening at the center and a baking chamber likewise having an upwardly extending frusto-conical opening at the center that is adapted to be placed on top of the base plate;

(3) To provide an oven that is indirectly heated at the bottom by the burner's flame and heated by the hot air internally within the baking chamber;

(4) To provide a glass-covered top for an oven in order to facilitate viewing of the baked food; and (5) To provide auxiliary cooking elements for the portable oven including a skillet, a "mess tray", a steamer, and a funnel lid.

DESCRIPTION OF THE PREFERRED EMBODIMENTS

Figure 1:
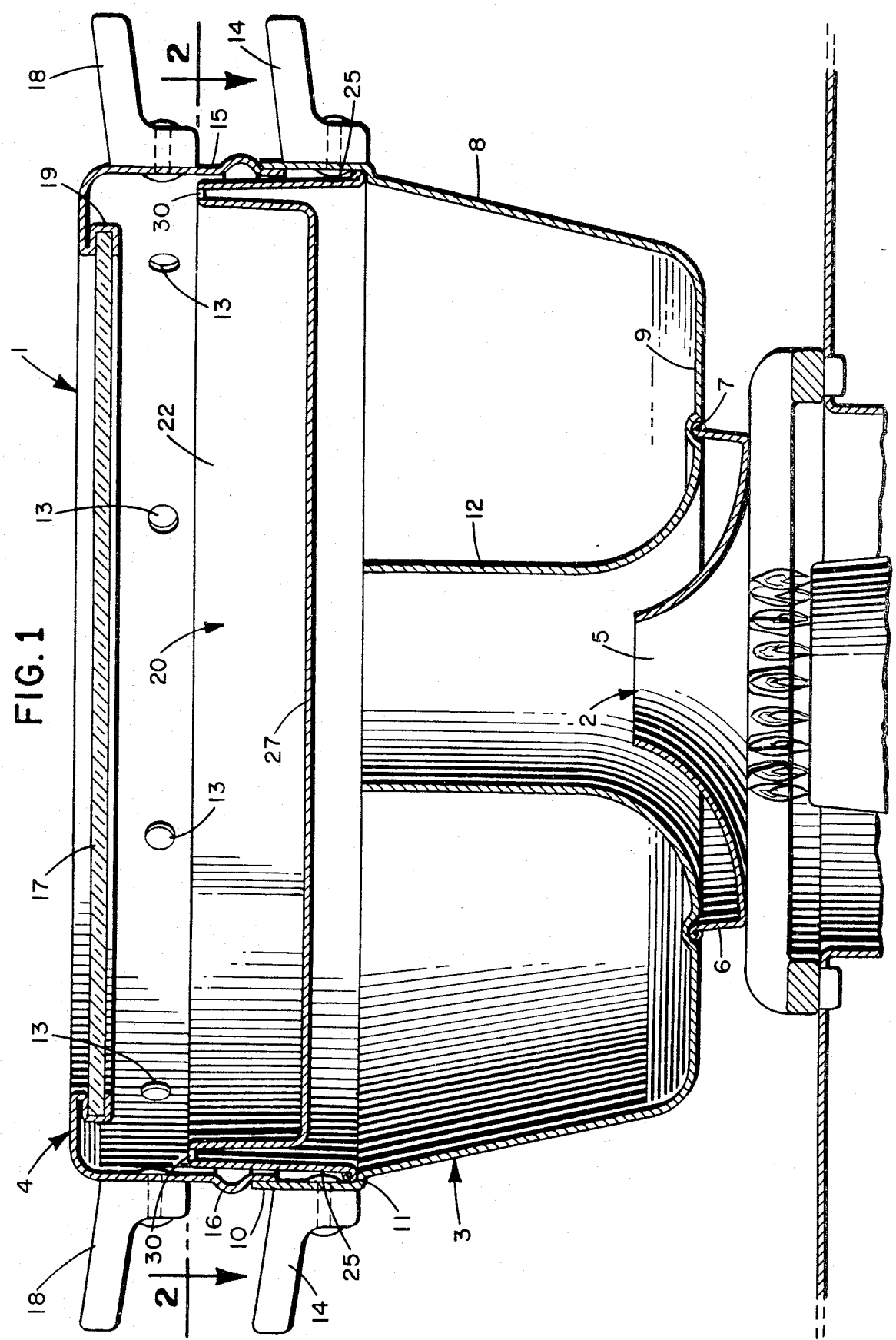
FIG. 1 is a vertical sectional view through the portable oven showing the combination of the base plate, oven body, skillet, and cover as one of the possible cooking combinations.

Referring now to the different views of the drawings, there is shown an assembled oven 1 comprising a base plate 2, an oven body 3, and a cover 4.

The base plate 2 is made of mild steel plate and formed by way of example to have a diameter of eight inches and a height of one and one-half inches. At the central portion thereof is an upwardly extending frusto-conical opening 5 that terminates in a one and one-half inch diameter hole at the apex. The base plate operates as a heat accumulator and deflector by directing the hot air being heated by the combustion of the liquified petroleum gas flame or electrive stove hot pipe, upward through the frusto-conical shaped opening in the center thereof. In this manner the oven's main baking chamber is not directly heated by the flame and charring of food that is being baked becomes remote. The peripheral edge 6 of the base plate 2 is slightly raised in order to fit in a circular groove 7 on the bottom of the oven 3.

The oven body 3 is of a construction identical to an ordinary cooking pot having a vertically extending sidewall 8 and a substantially flat bottom wall 9. The side wall 8 has an upwardly extending lip 10 that is joined to the vertical wall 8 by a ledge 11. The main difference from the ordinary cooking pot is the presence of a vertically extending frusto-conical opening 12 at the central portion of the bottom wall 9. This oven can be used in a multiple purpose in that it can be used to cook rice, to cook viands, or to bake different kinds of pastries.

The uppermost portion of the sidewall 8 has an upwardly extending lip 10 that is joined on the upper portion by a ledge 11. This lip 10 and ledge 11 facilitate the holding top cover 4 in a tight-fitting relation.

On the bottom wall 9 of the oven body is a circular groove 7 which is adapted to fit on the raised peripheral edge of the base plate 2 while the central portion is milled to form an upwardly extending frusto-conical opening 12. This opening 12 has a diameter of two and two-third inches and tappering outwardly as it goes downward.

The oven body 3 is made of, for example, 1/16" thick spun aluminum plate and is 11¾" in diameter and 6⅜" in depth. It has a tapering tubular part 12 in the center of the bottom wall 9 which allows hot air coming from the burner and hot base plate to pass through.

In order to provide a means whereby said oven can be held, a pair of handles 14 are placed opposite each other on the upper portion of the sidewall 8. These handles 14 can facilitate the transferring of said oven from one place to the other.

The cover 4 has a circular configuration with a flat top and a downwardly extending peripheral edge or skirt 15. The top of the metallic cover is cut and milled with a circumferentially disposed groove 19 which facilitates the force fitting of a circular heat resistant glass 17 that serves as a viewing window and at the same time a deflector of hot gases. The downwardly extending peripheral edge 15 of the cover contains a plurality of holes 13 which facilitates the outward passage of the hot air coming from the gas burner or from the hot base plate. Also provided on the edge 15 is a circumferentially disposed ridge 16 that is adapted to fit on the lip 10 of the oven 3. In order to facilitate the handling of the cover 4 while hot, a pair of handles 18 are provided which are heat resistant.

Figure 2:
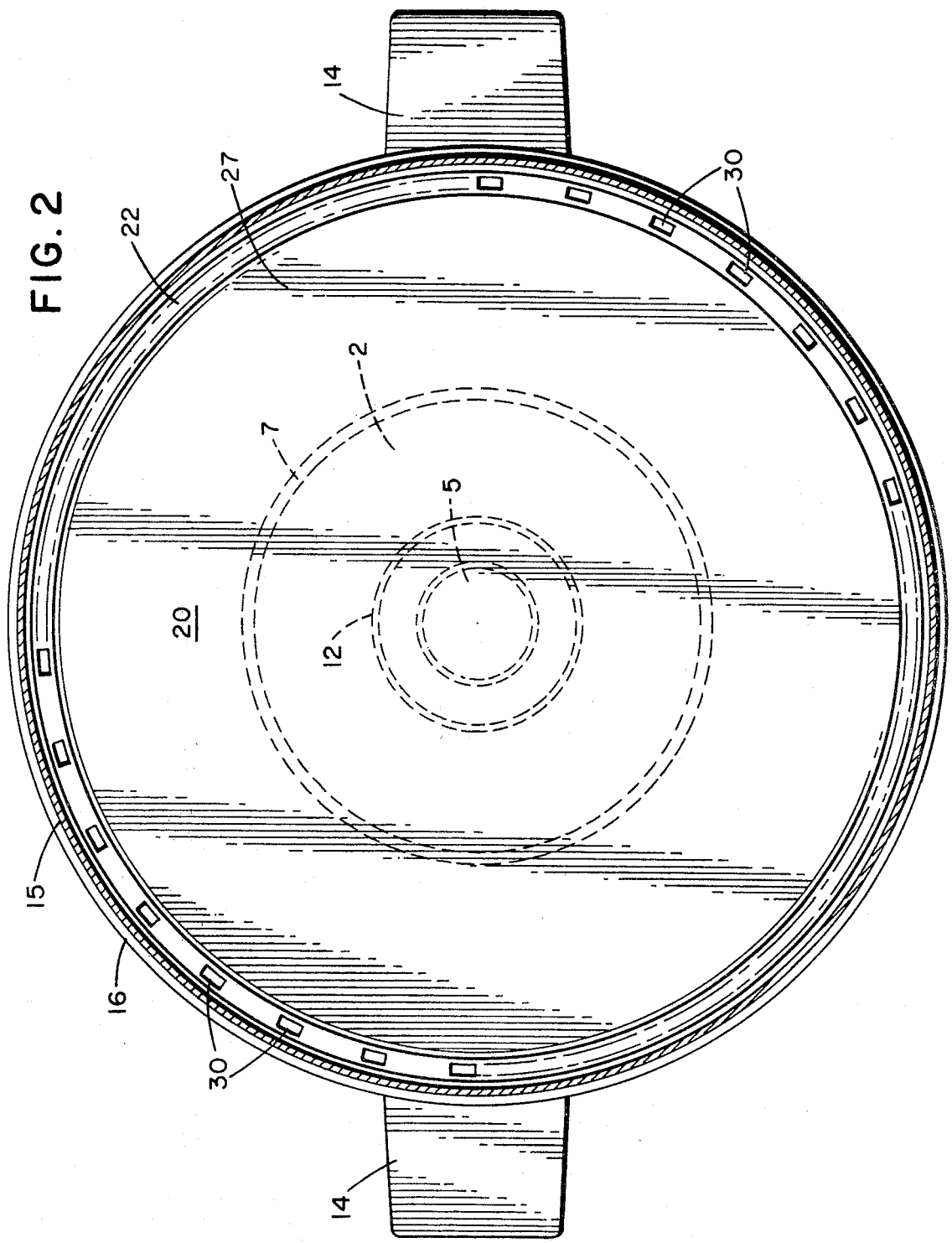
FIG. 2 is a horizontal sectional view taken on line 2—2 of FIG. 1.

FIG. 1 shows a portable oven of the present invention containing a skillet 20 made of aluminum and having a U-shaped periphery 22. The skillet rests against the oven body 3 by contact between the outside wall of the U 25 and ledge 11 of the body 3. The cooking area 27 of the skillet is placed above the top of the frusto-conical opening 12 of the oven body 3. The U-shaped periphery 22 contains holes 30 (shown in FIG. 2) to permit passage of hot air during cooking or baking.

Figure 3:
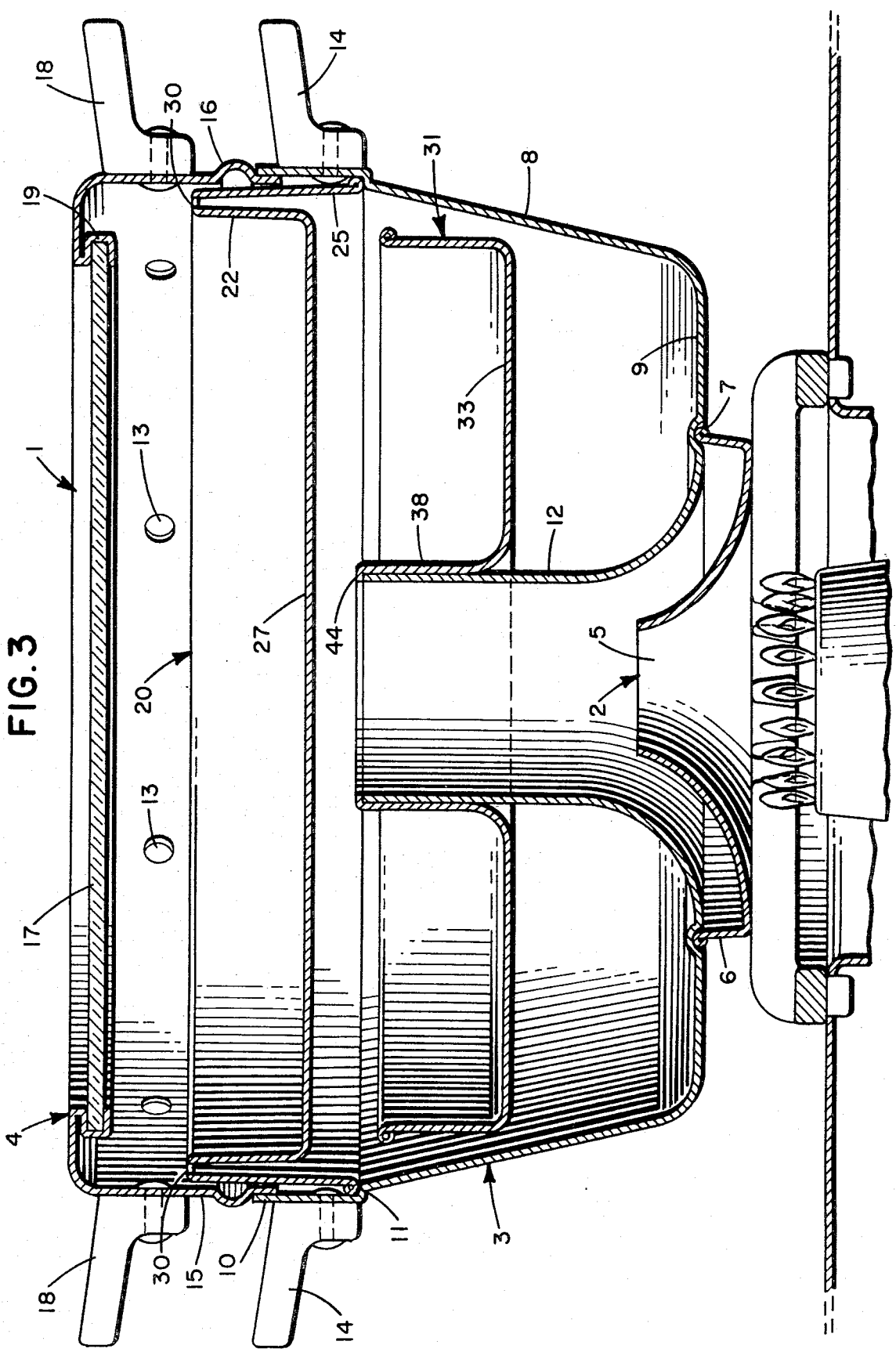
FIG. 3 is a vertical sectional view of another cooking combination using the "mess tray" and the skillet.

FIG. 3 shows a portable oven of the present invention containing the skillet 20 and a mess tray 31. The mess tray is also made of aluminum is placed over the frusto-conical opening 12 of oven body 3 and the area 33 for placing items such as vegetables is located below the top of the frusto-conical opening. The mess tray is placed over the frusto-conical opening and is in contact through tube 38. Flange 44 holds the mess tray in place.

Figure 4:
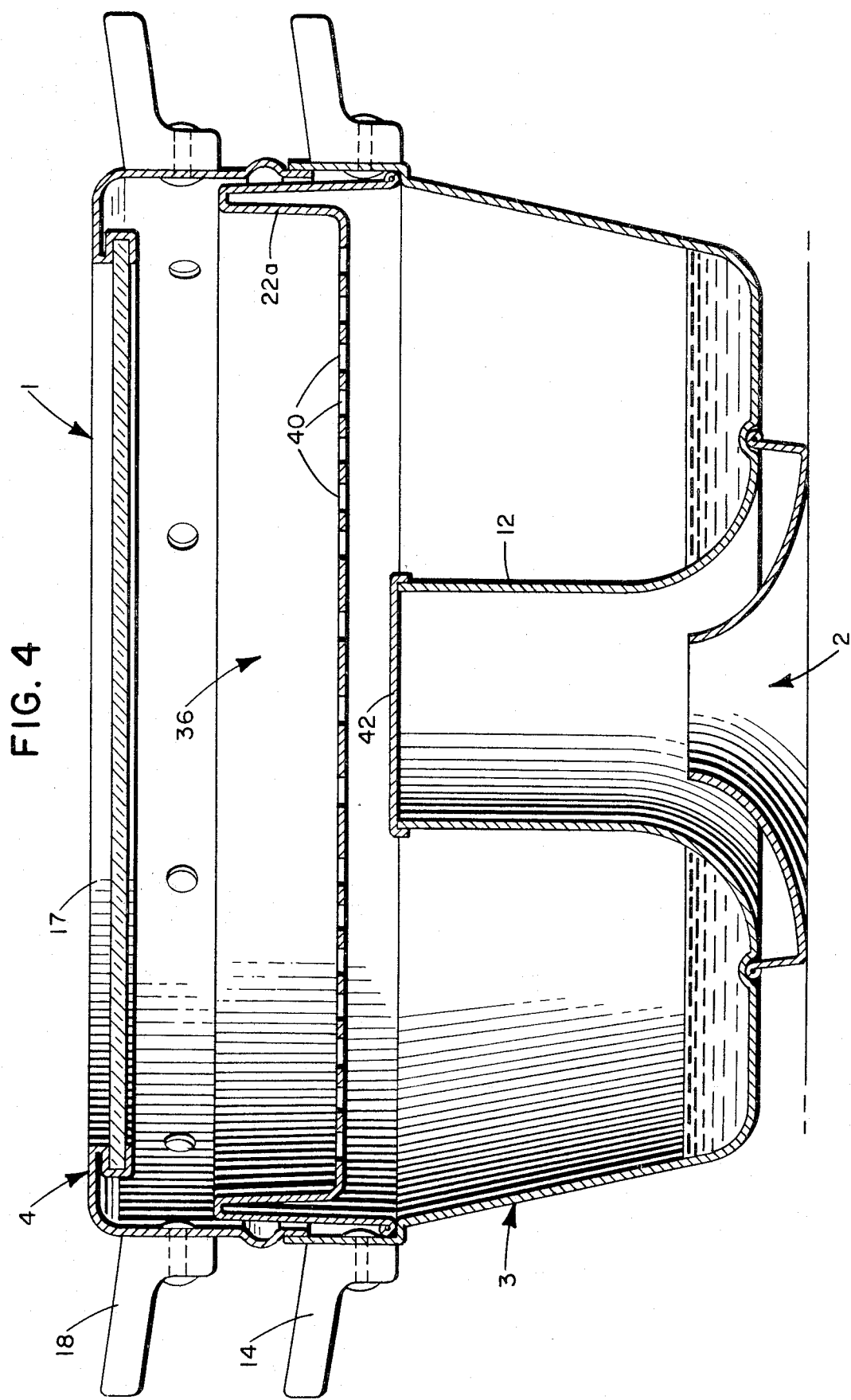
FIG. 4 is a vertical sectional view of a combination of parts for steaming food.
Figure 5:
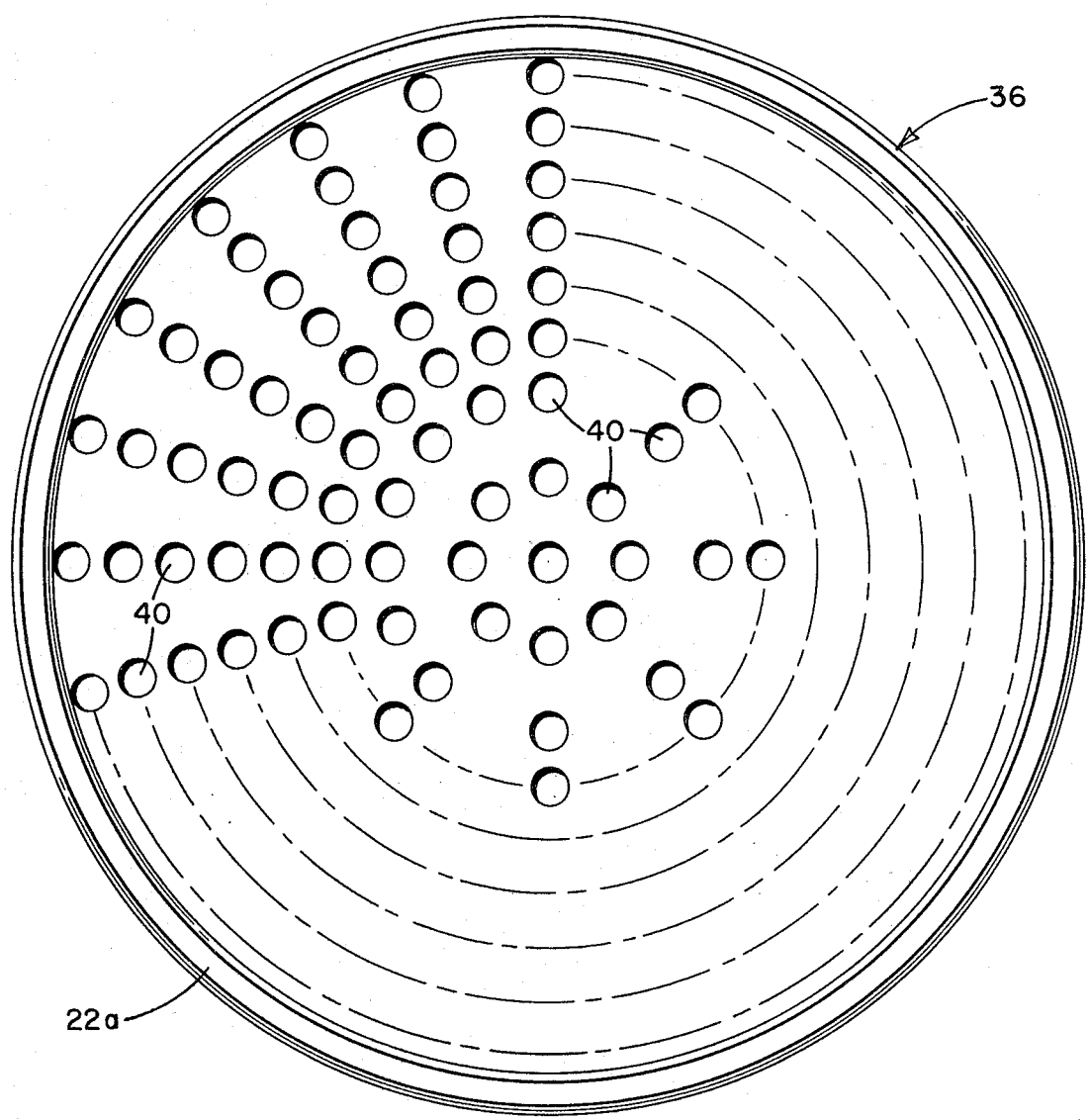
FIG. 5 is a top plane view of the steamer tray.

FIG. 4 shows a portable oven of the present invention with a steamer 36 that is similar to skillet 20 except that a plurality of holes 40 (shown in more detail in FIG. 5) are located along the bottom. The steamer 36 has no holes 30 in the top of peripheral wall 22a as skillet 20 does. The funnel lid 42 is placed over the top of the frusto-conical opening 12 to retain steam within the portable oven.

OPERATION

The base plate 2 is first placed on a gas burner or electric stove with the frusto-conical opening being up. Then the flame of the gas burner is lowered to a height of approximately ⅛" and the base plate 2 allowed to slowly heat up. Then the oven body 3 with mashed pastries is placed on top of said base plate 2 and the cover 4 placed on top of said oven. The oven is then allowed to be heated up to the moment wherein the pastries are baked.

Other types of operations can be readily carried out depending upon the type of food to be cooked. If one wants to fry hamburgers or hotdogs, then the skillet can be used and another food can be cooked in oven body 3 as shown in FIG. 1. Additional foods could also be cooked in the mess tray 33 as shown in FIG. 3. This embodiment allows one, for example, to cook rice in the oven body, cook vegetables in the mess tray, and steam or fry in the skillet at the same time. Steaming vegetables can be carried out as shown in FIG. 4.

What is claimed is:

1. A portable oven comprising in combination
    a base plate adapted to be placed on top of a gas burner or electric hot plate and having a circular flat bottomed portion with a slightly circumferential edge;
    an oven body placed on top of said base plate having an upwardly extending wall and a substantially flat bottom wall with a circular groove and a frusto-conical opening in the center of said bottom wall;
    a mess tray placed over said frusto-conical opening in the center of said oven body wall, said mess tray having a cooking area located below the top of said frusto-conical opening;
    a skillet placed within said oven body and resting therein above the frusto-conical opening in said oven body by contact with said upwardly extending wall of said oven body; and
    a cover placed on top of said oven body having a flat top and a downwardly extending skirt containing a plurality of holes allowing for passage of hot air from the interior of said oven body.

2. The portable oven of claim 1 wherein said base plate contains a frusto-conical opening at its center.

3. The portable oven of claim 1 wherein said cover contains a metallic portion and a glass top that is force fitted on said metallic portion.

4. The portable oven of claim 1 wherein said skillet has a U-shaped periphery and holes are placed in the central portion of the U to allow for the passage of hot air.

5. The portable oven of claim 1 wherein said base plate contains a frusto-conical opening at its center.

* * * * *